United States Patent [19]

Harriett

[11] Patent Number: 4,810,573

[45] Date of Patent: * Mar. 7, 1989

[54] SELF-HEALING BENTONITE SHEET MATERIAL COMPOSITE ARTICLE

[75] Inventor: Todd D. Harriett, Elk Grove Village, Ill.

[73] Assignee: American Colloid Company, Arlington Heights, Ill.

[ * ] Notice: The portion of the term of this patent subsequent to Apr. 7, 2004 has been disclaimed.

[21] Appl. No.: 75,567

[22] Filed: Jul. 20, 1987

Related U.S. Application Data

[60] Division of Ser. No. 816,266, Mar. 4, 1986, Pat. No. 4,733,989, which is a continuation-in-part of Ser. No. 676,279, Nov. 29, 1984, Pat. No. 4,656,062, which is a continuation-in-part of Ser. No. 604,990, Apr. 27, 1984, Pat. No. 4,534,926, which is a continuation-in-part of Ser. No. 443,225, Nov. 22, 1982, Pat. No. 4,534,925.

[51] Int. Cl.$^4$ .................. B32B 19/00; B32B 9/04; B32B 29/04
[52] U.S. Cl. .................... 428/331; 428/454; 428/497; 428/517; 428/518; 428/521; 405/107; 405/116; 405/263; 405/43; 52/169.14
[58] Field of Search ............... 428/331, 454, 497, 521, 428/517, 518

[56] References Cited

U.S. PATENT DOCUMENTS

| | | | |
|---|---|---|---|
| 4,467,015 | 8/1984 | Clem | 428/454 |
| 4,501,788 | 2/1985 | Clem | 428/454 X |
| 4,656,062 | 4/1987 | Harriett | 428/454 X |

Primary Examiner—P. C. Ives
Attorney, Agent, or Firm—Mason, Kolehmainen, Rathburn & Wyss

[57] ABSTRACT

The present invention relates to a layered water sealing article of manufacture including a layer of a flexible sheet material adhered to a layer of a composition comprising a non-hydrated water-swellable clay intimately contacted with a polypropene, polybutene, or mixtures thereof particularly useful as a water barrier. The water swellable clay composition can be adhered to the flexible sheet material in any manner, such as by extruding the composition in sheet form onto a layer of sheet material. The clay composition layer is sufficiently tacky to adhere to the sheet material on one major surface, and is sufficiently tacky for adherence to a wall, conduit, floor, roof, or other structure to be protected from water contact, on an exposed major surface in areas of potential water flow to prevent the seepage of water through the bentonite clay composition layer. In one embodiment, the clay composition layer includes a polypropene and/or a polybutene and an elastomer, such as butyl rubber, having sufficient resilience to stretch or expand with the expanding water-swellable clay composition upon hydration and to aid in maintaining the structural integrity and cohesiveness of the clay composition. In another embodiment, the clay composition layer comprises a water-swellable clay, an elastomer, and any plasticizer compatible with the elastomer.

4 Claims, 4 Drawing Sheets

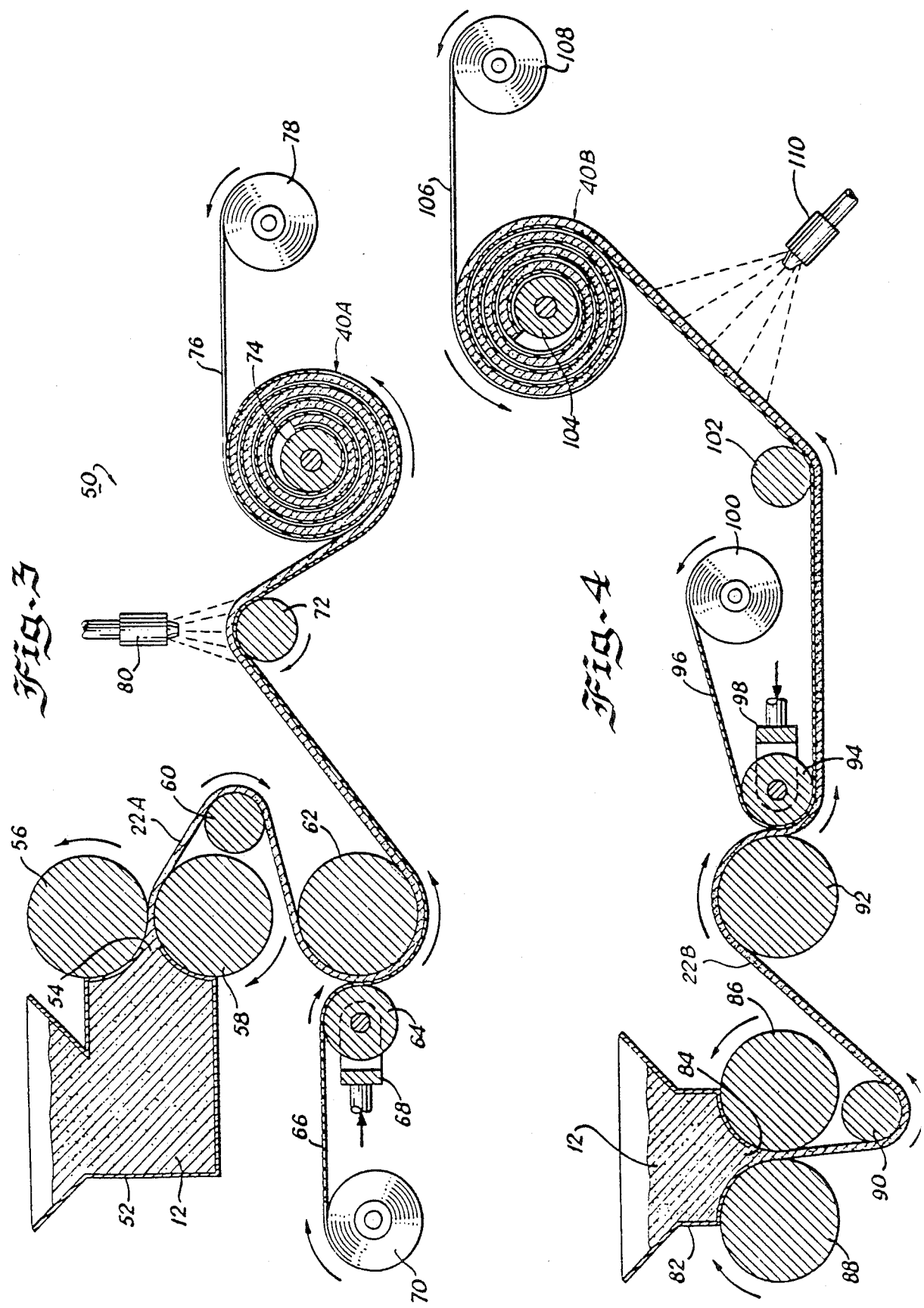

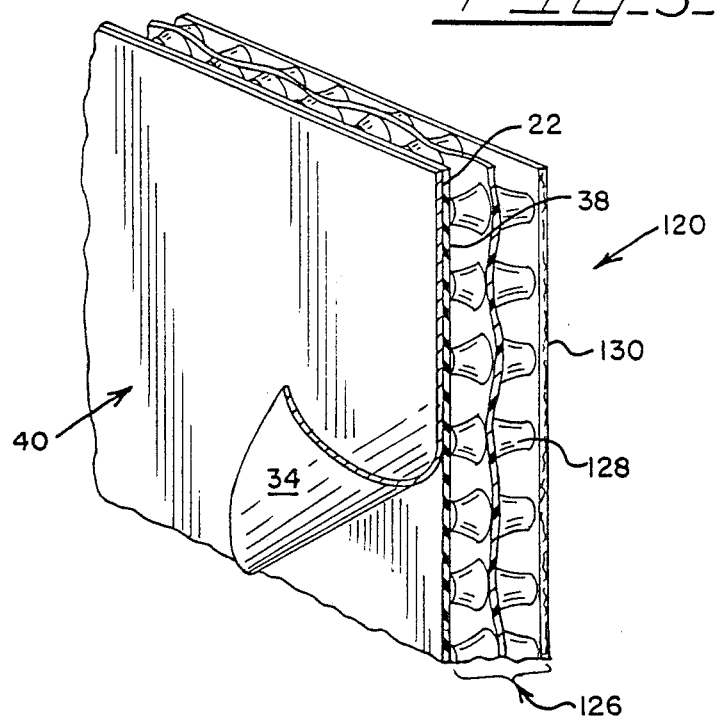
FIG-5-
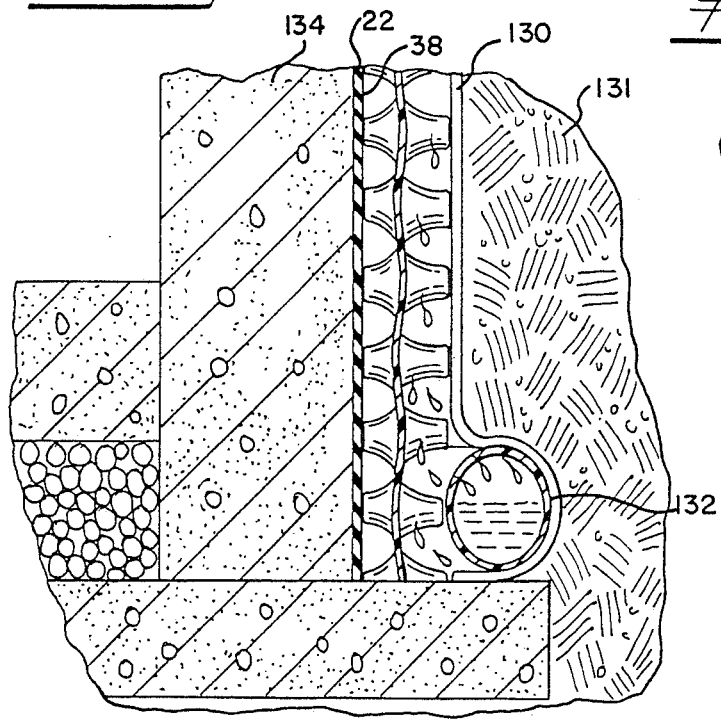
FIG-6-
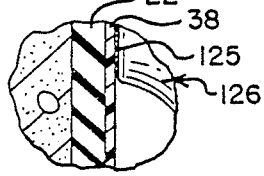
FIG-7-

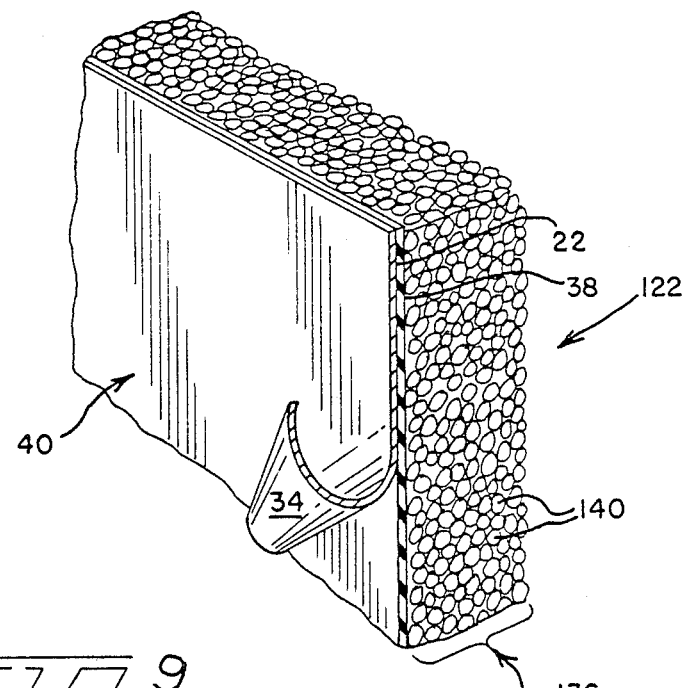
FIG_8_
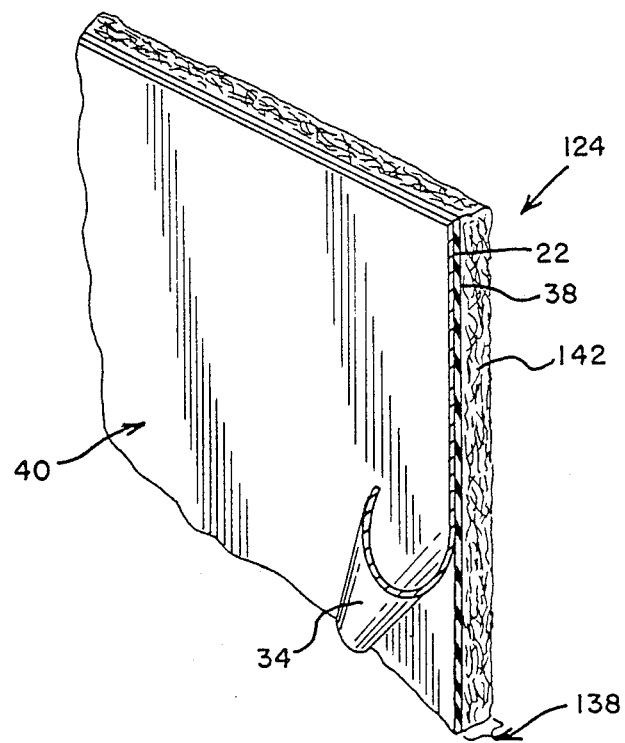
FIG_9_

SELF-HEALING BENTONITE SHEET MATERIAL COMPOSITE ARTICLE

CROSS REFERENCE TO RELATED APPLICATIONS

This is a division of application Ser. No. 816,266, filed Mar. 4, 1986 now U.S. Pat. No. 4,733,989, which is a continuation-in-part of copending application Ser. No. 676,279 now U.S. Pat. No. 4,656,062 filed Nov. 29, 1984, which is a continuation-in-part of application Ser. No. 604,990, filed Apr. 27, 1984, now U.S. Pat. No. 4,534,926, which is a continuation-in-part of application Ser. No. 443,225, filed Nov. 22, 1982 now U.S. Pat. No. 4,534,925.

FIELD OF THE INVENTION

The present invention is directed to a drainage structure including a water-penetrable layer having adhered thereto a sheet material including a cohesive, fully expandable, non-hydrated water-swellable clay composition layer adhered to a flexible water-impermeable support layer to provide a water seal layer. The bentonite composition is capable of expanding upon hydration outwardly from every water contacting surface in a new and unexpected manner while maintaining the cohesive integrity of the clay composition. In this manner, if the support layer is, or becomes, water-permeable, the water swellable clay composition layer will expand to seal the water permeable areas of the support sheet to prevent water penetration through the clay composition. More particularly, the present invention comprises a drainage structure having attached thereto a non-hydrated water-swellable clay intimately contacted, in one embodiment, with a polypropene, polybutene, or mixtures thereof to provide a formable and shapable non-aqueous water swellable clay composition layer particularly useful as a water barrier in sheet form adhered to a flexible sheet of support material. The water swellable clay composition layer can be extruded in the form of a sheet or the like and is sufficiently tacky for adherence to a water-impermeable layer of drainage structure-contacting support material. The bentonite composition/sheet material composite article is adhered at the support material to a drainage structure and the bentonite composition side of the drainage structure/composite article is applied such that the composition adheres to a foundation, conduit or floor in areas of potential water flow with the sheet material facing toward the potential water path to prevent the seepage of water from the drainage structure through the bentonite composition layer. In one embodiment, the water swellable clay composition layer includes an elastomer such as butyl rubber having sufficient resilience to stretch or expand with the expanding clay upon hydration and to aid in maintaining the structural integrity and cohesiveness of the composite water swellable clay composition-sheet material article of the present invention.

BACKGROUND OF THE INVENTION

Many attempts have been made to provide a bentonite composition having sufficient cohesiveness and structural integrity to provide a modeling clay-like or putty-like consistency. Such bentonite compositions can be in a paste or putty-like form for handleability so that a desired quantity can be applied in a selected location for water seepage control. A major problem associated with attempting to provide a bentonite composition with a paste or putty-like consistency in order to provide the desired handleability is that many additives used to provide such consistency interfere with the swelling capacity of the bentonite. One attempt to provide a bentonite composition with a putty-like consistency is described in the Bechtner U.S. Pat. No. 2,277,286 wherein water is added to the bentonite to hydrate a portion of the bentonite to achieve the desired consistency. The resulting composition is a putty-like mass which is sufficiently cohesive as a result of the partial swelling of the bentonite, but the swellability of the bentonite is substantially retarded since only about 70–80% of its potential absorbing and swelling characteristics are retained. Further, the Bechtner mass will only adhere to surfaces so long as it remains moist.

Other attempts have been made to provide a bentonite composition having a handleable consistency such as in a paste-like or putty-like form while retaining the full swelling properties of the bentonite by the addition of non-aqueous liquids, such as set forth in this assignee's prior U.S. Pat. No. 4,279,547 and the McGroarty U.S. Pat. No. 4,316,833. Generally, the addition of liquid organic additives to bentonite will inhibit the swelling capacity of the bentonite to various degrees depending on the characteristics of the organic additive, and most notably dependent upon the polarity of the organic additive. In accordance with the McGroarty U.S. Pat. No. 4,316,833, an attempt is made to provide a cohesive bentonite composition having a paste-like consistency without hydrating the bentonite by the addition of adhesive agents, such as hydrocarbon resins. In accordance with the McGroarty U.S. Pat. No. 4,316,833 "if the adhesive penetrates the bentonite, it will destroy the ability of the bentonite to swell and thus will destroy its waterproofing capabilities". In an attempt to prevent the adhesive agent penetration, the McGroarty bentonite is first saturated with a liquid fluidizer, such an mineral spirits, to prevent the adhesive agent from substantially, penetrating the bentonite particles after saturation with the liquid fluidizer.

This assignee's prior U.S. Pat. Nos. 4,209,568 and 4,279,547 describe other attempts to provide a bentonite composition having a consistency for good handlability such as a stiff putty-like consistency without hydrating the bentonite and without saturation of the bentonite with bentonite-inhibiting organics by forming a gel and adding the bentonite to the gel to prevent bentonite saturation while maintaining its swellability.

The Ishido U.S. Pat. No. 4,366,284 discloses a bentonite composition having 10–40% rubber, 10–40% plasticizer and 10–20% silicic filler. The silicic filler in an amount of at least 10% by weight is disclosed to be critical for swellability. In accordance with one embodiment of the present invention, it has been found that the bentonite compositions and attached sheet material adhered to a drainage structure in accordance with the present invention achieve substantially increased swellability so long as the composition contains essentially no silicic filler.

It has been found that the composition set forth in this assignee's prior U.S. Pat. No. 4,279,547 and in the McGroarty U.S. Pat. No. 4,316,833, while generally satisfactory in terms of composition consistency and maintenance of swellability, inhibit the swelling of the bentonite to a limited extent. A number of patents disclose the use of a liquid impermeable liner of polymeric sheet material, bentonite clay, or layers of the two to prevent escape of liquid or liquid waste materials to the surrounding environment. Examples of such patents include U.S. Pat. Nos. 4,255,067 to Wright; 4,035,543 to Draper et al; and 4,344,722 to Blais.

Other patents disclose the use of various plastic sheet or resin materials as water-proofing layers: U.S. Pat. Nos. 3,234,741 to Ionides; 3,326,001 to Stapelfeld; 3,383,863 to Berry ; 3,415,022 to Schaefer et al.; and 3,474,625 to Draper et al. The following patents disclose the use of asphalt or other bituminous material together with other materials, reinforcements or liners for lining earthen formations: U.S. Pat. Nos. 2,190,003 to VanHulst; 2,771,745 to Bramble; 3,160,512 to Cash et al.; and 3,380,254 to Rossi. The VanHulst patent No. 2,190,003 discloses the combination of bituminous substances and clay for admixture with soil.

In accordance with the present invention, it has been found that bentonite intimately admixed with polypropene, polybutene, or mixtures thereof will form a bentonite composition having a paste-like or putty-like consistency; sufficient tack to be adhered to a wall, floor, roof, conduit and the like; and most suprisingly and unexpectedly will increase the swelling capacity of the bentonite. In accordance with another embodiment of the present invention, a cohesive bentonite composition includes bentonite, an elastomer, and a plasticizer compatible with the elastomer. The compositions of the present invention readily adhere to a layer of flexible sheet material to provide a composite sheet material laminate readily attached to a drainage structure to prevent water from the drainage structure from penetrating past the bentonite composition. When adhered to a water-impermeable sheet layer, any holes or cracks formed in the sheet material layer when the composite material is applied to a drainage structure, or during aging, will be self-healed upon contact of water on the bentonite composition immediately below the hole or crack to prevent water seepage through the composite sheet material.

SUMMARY OF THE INVENTION

In brief, the present invention is directed, in one embodiment, to a laminate including a flexible sheet material adhered on one side to a drainage structure and adhered on an opposite side to a non-hydrated, water swellable clay compoiition layer comprising an intimate mixture of a water swellable clay, such as bentonite clay, with polypropene, polybutene, or mixtures thereof. In accordance with another embodiment of the present invention, an elastomer such as partially cross-linked butyl rubber is included in the clay composition layer. The elastomer has sufficient resiliency to stretch upon hydration of the water-swellable clay layer and adds structural integrity to the clay composition layer. To achieve the full advantage of the present invention, the clay compositions forming part of the laminates of the present invention, with and without an elastomer, include polypropene or polybutene in an amount of at least 10% by total weight to provide a swelling capacity more than the water-swellable clay alone. After intimate admixture of the the water-swellable clay with the polypropene, polybutene or mixtures, additional additives such as tackifiers, viscocity modifiers, thickeners, extenders and the like may be added. The polypropene and/or polybutene add sufficient tackiness to the clay composition and completely wet-out the clay upon initial intimate mixing to prevent substantial inhibition of the swelling properties of the clay. Further, the polypropene and/or polybutene components of the composition layer of the laminates of the present invention do not dry out over substantial periods of time in addition to providing the new and unexpected increase in swelling capacity of the water-swellable clay. Additionally, the capacity for polypropene and polybutene to wet-out the water-swellable clay composition layer enables the water-swellable clay composition layer to contain 85–90% water-swellable clay, e.g. bentonite, with 10–15% polypropene and/or polybutene while maintaining the tackiness and cohesive handleability of the composition.

In accordance with one important embodiment of the present invention, the clay composition layer of the laminates of the present invention includes a water-swellable clay, such as bentonite, an elastomer, such as partially cross-linked butyl rubber, and a plasticizer compatible with the elastomer. The elastomer is capable of stretching with the clay upon hydration to a greater degree with the included plasticizer to more effectively fill any water-permeable areas in an adhered sheet material intended to provide a second water-impermeable layer.

Accordingly, an object of the present invention is to provide an article of manufacture including a flexible support sheet adhered on one major surface to a drainage structure and adhered on an opposite major surface to a non-hydrated, cohesive water-swellable clay composition layer containing a water-swellable clay, polypropene and/or polybutene having new and unexpected swelling capabilities.

Another object of the present invention is to provide a method of manufacturing an article of manufacture including a flexible support sheet adhered on one major surface to a drainage structure and adhered on an opposite major surface to a non-hydrated, cohesive water-swellable clay composition layer containing a water-swellable clay, polypropene and/or polybutene having new and unexpected swelling capabilities.

Still another object of the present invention is to provide an article of manufacture including a flexible support sheet adhered on one major surface to a drainage structure and adhered on an opposite major surface to a non-hydrated, cohesive water-swellable clay composition layer having new and unexpected structural integrity for manufacture in sheet form including a water-swellable clay, polypropene and/or polybutene and an elastomer.

A further object of the present invention is to provide a method of manufacturing an article of manufacture including a flexible support sheet adhered on one major surface to a drainage structure and adhered on an opposite major surface to a non-hydrated, cohesive water-swellable clay composition layer having new and unexpected structural integrity for manufacture in sheet form including a water-swellable, polypropene and/or polybutene, and an elastomer.

Another object of the present invention is to provide an article of manufacture including a water-permeable or water-impermeable flexible support sheet adhered on one major surface to a drainage structure and adhere on an opposite major surface to a layer of a water-swellable clay composition comprising 35 to 90% by weight of a water-swellable clay, such as bentonite, and 10 to 65% by weight polypropene, polybutene or mixture.

Still other objects of the present invention are to provide an article of manufacture including a layer of liquid-impermeable or liquid permeable flexible sheet material adhered on one major surface to a drainage structure and adhered on an opposite major surface to a new and improved water-swellable clay composition and a method of manufacturing the article of manufacture wherein the clay composition layer includes a water-swellable clay, an elastomer, and a plasticizer compatible with the elastomer resulting in a composite article having extremely good structural integrity wherein the water-swellable clay is not substantially inhibited from swelling.

BRIEF DESCRIPTION OF THE DRAWING

FIGS. 3 and 4 are schematic views of alternate apparatus used to manufacture the laminated clay composition layer of FIG. 1, or similar clay composition layers.

FIG. 5 is a partially broken away, perspective view of a composite drainage structure of the present invention including the laminate of FIGS. 1, 3 or 4;

FIG. 6 is a partially broken away cross-sectional view showing the composite drainage structure of FIG. 5 adhered to an underground concrete structure;

FIG. 7 is an enlarged, broken away view from FIG. 6, showing the clay composition/sheet material laminate of the present invention adhered to a drainage structure and to the concrete structure; and FIGS. 8 and 9 are partially broken-away, perspective views showing alternate embodiments of composite drainage structures of the present invention.

DETAILED DESCRIPTION OF THE PRESENT INVENTION

Figure 1:
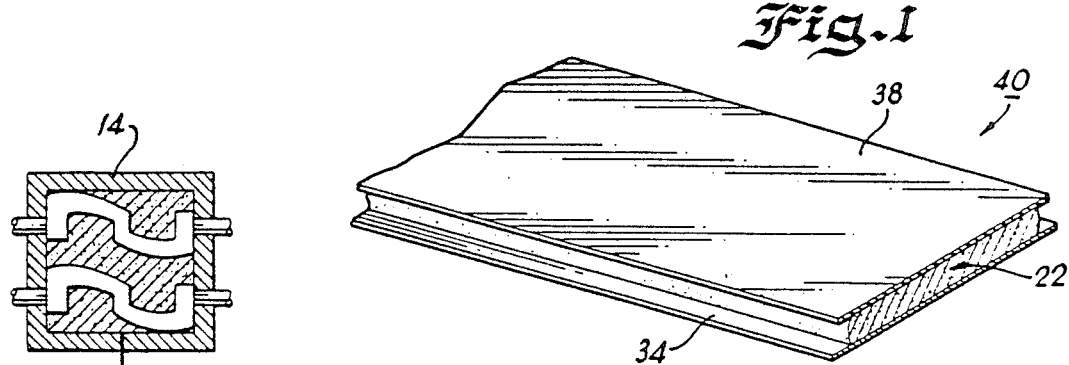
FIG. 1 is a partially broken-away perspective view of an article of manufacture of the present invention including a water-impermeable top sheet, a lower release sheet and an intermediate bentonite composition layer.

In accordance with the present invention, a water swellable clay intimately mixed with a polypropene, a polybutene or a mixture of polypropene and polybutene will provide a bentonite composition layer having a desired consistency ranging from a soupy liquid to a relatively stiff putty-like and tacky solid and having new and unexpected capacity for swelling. The clay composition layer is adhered to a water-non-biodegradable, for example, zeotextile, such as a polyethylene sheet material having a thickness of about 4 to 30 mils. and the opposite surface of the sheet material is adhered to a suitable drainage structure. The clay composition layer then can be applied against an area of potential water flow such as a foundation, floor or conduit so that the drainage structure channels water in a predetermined direction with the clay composition layer acting as a safety layer to make sure that water does not penetrate the area to be protected from water flow. The water swellable clay in the clay composition layer, for example bentonite, is included in the clay composition layer in an amount of about 35% to about 90% by weight and the polypropene and/or polybutene is included in the clay composition layer in an amount of about 10% to about 65% by weight of the composition.

To achieve the full advantage of the present invention, the clay composition layer should include polypropene, polybutene or mixtures thereof in an amount of at least 15% by weight. Additional tackifiers compatible with the polypropenes or polybutenes may be included for additonal tack, for example, aliphatic petroleum hydrocarbon resins such as polyterpenes, hydrogenated rosins, and mixed olefins, polystyrene, pentaerythritol esters and phenolic resins. Generally, aromatic tackifiers are not suitable since they will bleed to the surface of the composition and separate thereby reducing the handleability and consistency of the composition. Other additives such as viscosity controlling agents, fillers, tackifiers and the like may be added to impart any desired physical characteristics to the clay composition layer. However, it has been found that the addition of a silicic filler, e.g. silicic acid or calcium silicate, substantially decreases the water-swellability of the clay composition layer of the present invention. Accordingly, to achieve the full advantage of the present invention, essentially no silicic filler should be added to the clay composition layer. Silicic filler added in an amount of only 1% by weight reduces the water swellability of the clay composition layer by about 10%. Silicic filler added to the clay composition layer in an amount of 5% by weight reduces the water swellability of the clay composition by about 20%. To achieve the full advantage of the present invention, the silicic filler, if any, should be 1% by weight or less of the water-swellable clay composition layer.

Evaporative solvents such as mineral spirits may be added to the clay composition layer of the present invention to aid in mixing, but it is preferred to combine the clay composition layer components without such solvents. In any case, the polypropene, polybutene or mixtures should be present in the final composition, after evaporation of any solvents volatizable under ambient conditions, in an amount of at least 10% by weight.

In accordance with an important feature of the present invention, no additives are necessary to protect the water-swellable clay, polypropene and/or polybutene composition layer of the composite articles of the present invention since the polypropenes and polybutenes will completely wet out the water-swellable clay in amounts up to about 90% by weight water-swellable clay without inhibiting the swelling characteristics of the clay. Quite unexpectedly, the polypropene and/or polybutene component increases the capacity of the water-swellable clay composition to swell while providing sufficient tack so that the clay composition layer easily can be adhered to substantially any surface over extended periods of time.

The water-swellable colloidal clay utilized in the clay composition layer of the multi-layered articles of the present invention is any water swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, i.e., bentonite, generally is finely divided as known for use in water barrier panels and the like, i.e, 150 to 350 mesh.

The polybutenes forming part of the water-swellable clay composition layer, in accordance with the principles of the present invention, generally comprise $(C_4H_8)_n$, where n ranges from about 6 to about 45, having average molecular weights in the range of about 300 to about 2,500. The commercially available useful polybutenes are predominantly of high molecular weight mono-olefins and can include 100% of the polybutene or include up to about 10% isoparaffins. The polybutenes are chemically stable, non-drying liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of water-swellable clay included within the clay composition layer of the multi-layer articles of the present invention.

The polypropenes forming part of the water-swellable clay composition layer, in accordance with the principles of the present invention, generally comprise $(C_3H_6)_n$ where n ranges from about 7 to about 60 having molecular weights in the range of about 300 to about 2,500. The commercially available polypropenes useful in the clay composition layer, in accordance with the present invention, generally are amorphous in character and may be combined with up to about 10% by weight of a suitable processing solvent, such as ligroin, although the polypropenes may be blended with the bentonite easily at elevated temperatures i.e. 200° C. without a solvent.

To achieve the greatest swelling of the water-swellable clay composition layer of the composite articles of the present invention, the polypropene or polybutene or mixtures should be present in the water-swellable clay composition layer in an amount of about 15% to about 30% by weight of the total composition.

In testing to determine if the polypropenes and polybutenes would inhibit the swelling characteristics of the water-swellable clay layer, two compositions were prepared in accordance with the present invention-the first containing approximately 78% bentonite and 22% polybutene and the second containing about 78% bentonite and 22% polypropene. For comparison, one gram of bentonite alone was placed in one graduated cylinder while one gram of the above two compositions of the present invention were placed in a second and third graduated cylinder. Each of the compositions were wetted and permitted to swell for about 48 hours. After complete swelling, it was found that the bentonite alone swelled to a volume of about 9 ml while the two compositions of the present invention containing polypropene or polybutene swelled to a volume of 10 ml.

In accordance with another important feature of the present invention, it has been found that the addition of an elastomer in an amount of about 1% to about 20% based on the total weight of the water-swellable clay composition layer of the present invention will substantially increase the handleability of the composition without impeding its swellability. To achieve the full advantage of this embodiment of the present invention, the elastomer should be included in an amount of about 2% to about 10% based on the total weight of the clay composition layer. Surprisingly, it has been found that mastication or shearing, i.e. in a sigma blender, of a water-swellable clay composition containing a water-swellable clay, such as bentonite, polypropene and/or polybutene, and an elastomer, actually increases the capacity of the composition to swell in an amount greater than the water-swellable clay alone; and greater than the water-swellable clay, polypropene/polybutene composition without the elastomer.

In testing the swellability of the water-swellable clay composition layers of the present invention including an elastomer, the two clay compositions prepared above (polybutene and polypropene) were blended separately in a sigma blender with 4.95% partially cross-linked butyl rubber to thoroughly masticate the butyl rubber into the compositions to form two homogeneous blends. One gram of each of the compositions containing 4.95% butyl rubber, 75.25% bentonite clay and 19.8% of polybutene or polypropene were placed in two graduated cylinders and submerged in water for approximately 48 hours to make sure that the compositions were completely swelled. When completely swelled, one gram of each composition containing the butyl rubber had swollen to approximately 13-14 ml—greater than the swelling which occurred with one gram of bentonite alone and greater than the swelling which occurred with the bentonite/polypropene or bentonite/polybutene compositions, although these compositions without elastomer actually included more bentonite. The compositions containing the butyl rubber were easily handleable and extrudeable to any desired shape and would retain their form when adhered to a surface for water seepage control.

Essentially any elastomer having at least 100% elongation and, in accordance with an important feature of the present invention having at least 500% elongation, can be used in the water-swellable clay composition layer of the composite articles of the rresent invention to substantially improve the handleability, cohesiveness and structural integrity of the water-swellable clay composition layer and multi-layered articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender, i.e. sigma blender, during mastication and mixing with the other clay composition layer components. Fully cross-linked elastomers generally are not suitable for incorporation into the clay composition layers of the present invention since their elongation capacity is insufficient to permit full expansion of the water-swellable clay composition layer during hydration. However, any elastomer having at least 100% elongation is suitable as a component of the water-swellable clay composition layer of the multi-layered or laminated articles described herein, and included within the scope of the present invention.

To achieve the full advantage of the present invention, the elastomers should have an elongation of at least 500% to allow for the new and unexpected clay swelling discovered in accordance with the principles of the embodiment of the invention directed to intimately contacting bentonite with polypropene and/or polybutene to form the water-swellable clay composition layer of the articles of the present invention. Suitable elastomers include butyl rubber and polyisobutylene Additional suitable elastomers for incorporation into the clay composition layer of the composite articles of the present invention include styrene-butadiene, styrene-isoprene, synthetic and natural rubbers, ethylene-propylene copolymers and terpolymers, halogenated butyl rubber, and partially cross-linked butyl rubbers having divinylbenzene added to form a terpolymer for the purpose of imparting a degree of "cure". The elastomer can be shredded prior to mastication with the water-swellable clay and polypropenes and/or polybutenes to decrease mixing time, although shredding is not necessary. Mastication and homogeneous flow of the elastomer throughout the water-swellable clay composition layer can be achieved with the elastomer in any desired shape, i.e., pellet form, for example in a sigma blender.

In accordance with another important feature of the present invention, the water-swellable clay composition layers disclosed herein can include additives capable of forming a skin on the composition, such as a copolymer of vinyl toluene with a vegetable drying oil. The clay composition layers containing skins are useful wherever the clay composition layer does not require tackiness for securing the composition to its intended location. If tackiness is desired, a surface coating of any suitable tackifier may be applied over the clay composition layer or over the skin.

In accordance with still another important embodiment of the present invention, the water-swellable clay composition layer of the composite articles of the present invention includes a water-swellable clay, such as bentonite, in an amount of 35-90% by weight, an elastomer in an amount of 1-20% by weight, and any plasticizer compatible with the elastomer and capable of plasticizing the elastomer, in an amount of 2-50% by weight based on the total weight of the clay composition layer. The plasticizer improves the workability of the elastomer, extends the elastomer, enables the elastomer to re-position itself with expansion of the water swellable clay when the clay is wetted, and wets the water-swellable clay surface sufficiently to enable the elastomer to accept substantial amounts of the water-swellable clay (up to about 90%) and to provide a homogeneous clay distribution throughout the elastomer in the clay composition layer of the composite articles of the present invention.

It has been found that an elastomer having an elongation of at least 100% will permit the water-swellable clay to substantially completely expand upon water contact so long as the elastomer includes a plasticizer in an amount of at least 2% based on the total weight of the clay composition layer. The elastomer provides exceptionally good structural integrity to the clay composition layer without substantially inhibiting the swellability of the clay. The elastomers should be partially, but not completely, cross-linked and include, for example, butyl rubber, styrene-butadiene, styrene-isoprene, other synthetic and natural rubbers, ethylene-propylene copolymers, ethylene and propylene terpolymers.

Suitable plasticizers are the relatively low polarity plasticizers including epoxidized oils, such as epoxidized soybean oil; alkyl monesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils; napthenic-paraffinic oils; and paraffinic oil.

To achieve the full advantage of this embodiment of the present invention, the plasticizer should be included in the clay composition layer in an amount of at least 10% by weight of the clay composition layer to plasticize the elastomer and fully wet-out the bentonite. The plasticizers generally are included in an amount of 10-30% based on the total weight of the clay composition layer.

Figure 2:
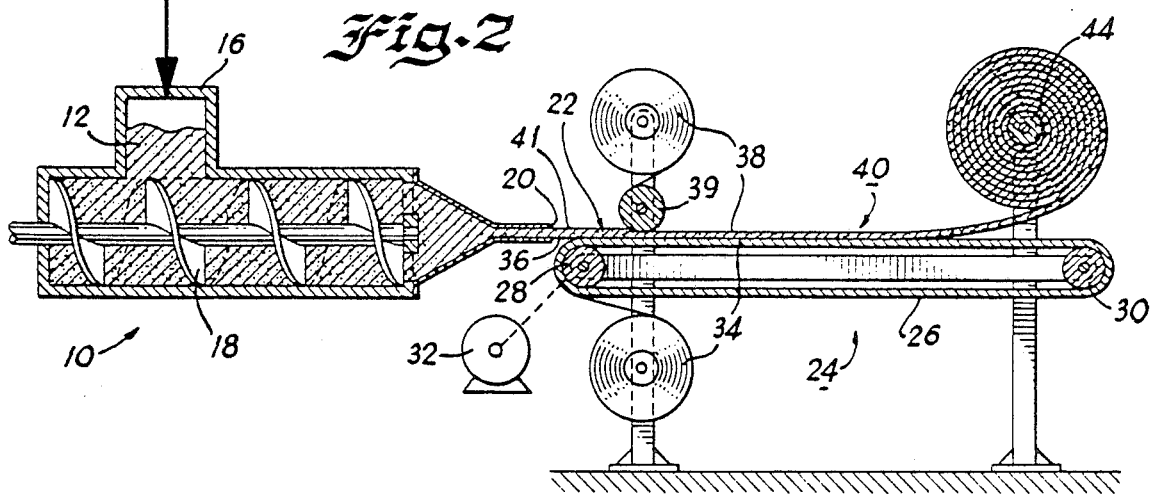
FIG. 2 is a schematic view of the apparatus used to manufacture the article of manufacture of FIG. 1.

Turning now to the drawings, and initially to FIG. 2, apparatus generally designated 10, is illustrated in schematic form for extruding the clay composition layer of the multi-layer composite articles of the present invention into sheet form. The water-swellable clay composition 12 comprising an intimate mixture of bentonite, with polypropene and/or polybutene in one embodiment, or with a plasticizer in another embodiment, is thoroughly blended in a homogeneous blend with an elastomer, such as butyl rubber, in a sigma blender 14 to fully masticate the elastomer to provide a homogeneous bentonite composition into an extruder 16. Auger 18 of extruder 16 forces the bentonite composition through a die opening 20 in extruder 16 to form a sheet, generally designated 22, of water-swellable clay composition. The sheet of material 22 is directed onto a conveyor, generally designated 24, including an endless conveyor belt 26 driven around rollers 28 and 30 by a conveyor motor 32. It should be understood that any method and apparatus suitable for shaping the composition into sheet form, such as calendaring, can be used to form the composition sheet or layer 22. The conveyor 24 can be driven at a variety of predetermined speeds by the conveyor motor 32. By varying the speed of the conveyor belt 26 relative to the speed at which the extruded sheet 22 exits the die opening 20, the sheet can be stretched or compressed slightly to vary the thickness of the extruded clay composition sheet 22. The conveyor 24 includes a continuous supply of release paper 34 directed over the conveyor belt 26 for contact against an undersurface 36 of the clay composition layer or sheet 22 being extruded through the die opening 20 of extruder 16.

A continuous supply of a water-impermeable sheet material 38 is disposed above the conveyor 24 to direct the sheet material 38 around contact roller 40 to adhere the sheet material 38 to an upper surface 41 of the bentonite composition sheet 22. The resulting lamination, generally designated 40, of clay composition layer or sheet 22, release paper 34 and water-impermeable sheet 38 is wound around a take up roller 44 as the bentonite composition sheet 22 is extruded onto the release paper 34 to provide the clay composition layer laminate 40 in a coiled, roll form. Similarly, the sheet 40 may be cut to length at a suitable cutting station (not shown).

In accordance with an important feature of the present invention, the upper sheet material layer 38 of the lamination 40 of the present invention should be water-impermeable to provide two water-proofing seals. The upper sheet material layer 38, under ideal conditions and proper installation will, by itself, prevent water or other liquids from penetrating the laminate 40. Sometimes, however, cracks or fissures develop in the "water-impermeable" sheet material permitting water penetration. It has been found, quite unexpectedly, that the bentonite composition layer 22 of the composite articles of the present invention will expand to an unexpected volume upon water contact while maintaining structural integrity to permanently fill any cracks, fissures or gaps in the sheet material 38, thereby acting as an unexpectedly effective additional safety valve to insure that the laminate 40 self heals to prevent essentially all liquid penetration to the area protected by the composite drainage structure of the present invention. The bentonite composition 12 is tacky and readily adheres to solid, stable structures.

The water impermeable upper sheet of material 38 can be any flexible, water impermeable sheet material, such as polyvinyl chloride, a polyolefin, such as polyethylene or polypropylene and the like. Generally, the thickness of the water-impermeable sheet material 38 is on the order of about 3 to about 50 mils. While the release paper 34 is not essential to the laminate 40 the release paper 34 permits the laminate 40 to be rolled upon itself and easily unrolled and secured to a drainage structure, in the manufacture of the composite articles shown in FIGS. 5–9.

The sheet materials including butyl rubber and those having a very high percentage of bentonite, e.g. 70–90% bentonite, sometimes are difficult to extrude into wide sheets, as shown in FIG. 1. Accordingly, in accordance with another important feature of the present invention, alternate apparatus, shown schematically in FIGS. 3 and 4, is capable of forming sheet materials from the clay composition layer of the composite articles of present invention.

The apparatus of FIG. 5, generlly designated 50 is illustrated schematically for forming the clay composition layer and securing a flexible sheet or web and an optional release layer thereto. The thoroughly blended clay composition 12 is received in a hopper 52 having a discharge opening 54 disposed in horizontal alignment with a pair of forming rollers 56 and 58 having a predetermined spacing to provide a clay composition layer of a desired thickness. The forming rollers 56 and 58 are motor (not shown) driven clockwise to push the clay composition through the spacing between them and shape the clay composition into sheet form. It has been found that a suitable lubricant, such as a polyglycol, e.g. polyethylene glycol, in an amount of about 0.5% to 2.0% by weight, added to the clay composition, aids in preventing the clay composition from sticking to the forming rollers 56 and 58 and other apparatus during manufacture.

As shown in FIG. 5, the clay composition 12 is extruded into sheet form to form a clay composition layer 22A. The clay composition layer 22A is conveyed over a directional roller 60 and then between pressure rollers 62 and 64 where a sheet or web of water-impermeable flexible sheet material 66 is adhered to the clay composition sheet material 22A. The flexible sheet material 66 can be the same as the sheet material layer 38 described with references to FIGS. 1 and 2. The pressure applied on the sheet or web of water-impermeable flexible sheet material 66 can be adjusted to make sure the sheet material 66 adheres to the clay composition by adjusting yoke 68 to move the pressure roller 64 closer to or farther from pressure roller 62. The sheet material 66 is supplied between the pressure rollers 62 and 64 from a supply roll 70 of water-impermeable flexible sheet material.

The clay composition sheet material layer 22A having a sheet or web of water-impermeable sheet material 66 applied thereto proceeds over directional roller 72 and is wound onto a take-up roller 74. During winding on take-up roller 74, an optional layer of a release material 76 is applied over the clay composition sheet material to sandwich the clay composition sheet material 22A between the optional release material 66 and the flexible sheet material 76 to form laminate 40A. The release material 66 is optional in many cases, such as when the water impermeable flexible sheet material 66 applied is lubricious, such as a sheet layer of a polyolefin, e.g. polyethylene or polypropylene, and is supplied from supply roll 78, as shown in FIG. 5. If desired, an adhesive can be applied to the clay composition sheet material, such as from spray nozzle 80, prior to applying the release sheet or web 76 to make sure that the clay composition sticks in place to a suitable drainage structure to form the composite articles of the present invention, as shown in FIGS. 5–9.

The manufacture of the clay composition laminate 40B shown schematically in FIG. 6 is very much the same as that shown in FIG. 5 except that the clay composition 12 is initially received in a hopper 82 having a discharge opening 84 disposed vertically above a pair of forming rollers 86 and 88 having a predetermined spacing to provide a clay composition layer of a desired thickness. The vertical disposition of the composition hopper 82 aids, by gravity, in forcing the clay composition 12 between motor (not shown) driven forming rollers 86 and 88.

The formed clay composition sheet material layer 22B is conveyed under a directional roller 90 and then between pressure rollers 92 and 94 where a sheet or web of water-impermeable, flexible sheet material 96 is adhered to the clay composition sheet material 22B. The sheet material 96 can be the same as the sheet material layer 38 described with reference to FIGS. 1 and 2, or the same as sheet material layer 66 described with reference to FIG. 5.

The pressure applied on the sheet or web of water-impermeable flexible sheet material 96 can be adjusted to make sure the sheet material 96 adheres to the clay composition by adjusting yoke 98 to move the pressure roller 94 closer to or farther from pressure roller 92. The sheet material 96 is supplied between the pressure rollers 92 and 94 from a supply roll 100 of water-impermeable, flexible sheet material 96.

The clay composition sheet material 22B having a sheet or web of water-impermeable sheet material 96 applied thereto proceeds under directional roller 102 and is wound onto a take-up roller 104. During winding on take up roller 104, an optional layer of a release material 106 is applied over the clay composition sheet material to sandwich the clay composition sheet material 22B between the optional release material 96 and the flexible, water-impermeable sheet material 96. The release material 106 is optional in many cases, such as when the water-impermeable flexible sheet material 96 applied is lubricious, such as a sheet layer of polyethylene or polypropylene, and is supplied from supply roll 108, as shown in FIG. 6. If desired, an adhesive can be applied to the clay composition sheet material, such as from spray nozzle 110 prior to applying the release sheet or web 96 to make sure that the clay composition sticks in place to a suitable drainage structure to form the composite articles of the present invention, as shown in FIGS. 5–9.

FIGS. 5–9 show the composite articles of the present invention, generally designated 120, 122, and 124, formed by securing the water-impermeable sheet layer 38, 66 or 96 of the laminates 40, 40A or 40B of FIGS. 1–4 to a suitable drainage structure. In accordance with the principles of the present invention, the laminate 40, 40A or 40B is disposed adjacent to, or secured to a major surface of, any drainage structure useful in channeling water away from an area to be protected from water damage for further protection against water damage. Any suitable water-insoluble adhesive 125, such as a high solid (65% by wt.) acrylic copolymer pressure sensitive emulsion adhesive having a Brookfield RVF viscosity at 25° C. of 2150 cps. sold by Union 76 under the trademark 76 RES 9202 applied over the outer surface of the water-impermeable sheet material layer 38, 66 or 96 can be used to secure the laminate 40, 40A or 40B to the drainage structure to form the composite articles of the present invention, or the laminate 40, 40A or 40B can be simply disposed in place adjacent the drainage structure without bonding thereto.

Drainage structure 126, shown in FIG. 5, is commercially available from Mirati, Inc. and sold under U.S. Pat. Nos. 3,563,038 and 3,654,765. The drainage structure 126 is a prefabricated drainage mat including a three-dimensional plastic core 128 providing longitudinal channels for water flow covered on a soil or water-source side with a water-permeable fabric filter layer 130. The fabric layer 130 allows water to penetrate from adjacent soil 131, or other water source, through the fabric 130 to flow longitudinally throughout the core 128 for collection in a perforated drainpipe 132 (FIG. 6).

Theoretically, the drainage structure 126 will prevent surrounding water from reaching an adjacent area, such as concrete foundation 134 shown in FIG. 6. However, sometimes water will penetrate the plastic core 128 and reach the foundation 134. In order to protect the foundation from possible water damage, in accordance with an important feature of the present invention, a laminate 40, 40A or 40B described with reference to FIGS. 1-4 is secured to the plastic core 128 and the clay composition layer 22, 22A or 22B, after removal of release sheet 34, is secured to the foundation 134, or other area to be protected from water damage. The clay composition layer 22, 22A or 22B is sufficiently tacky for adherance to most surfaces and, if necessary, a suitable adhesive coating, such as 76 RES 9202, is applied over the outer surface of the clay composition layer 22, 22A or 22B to secure the clay composition layer in place. The entire composite article 120 shown in FIGS. 5-7 preferably is provided to include the release sheet 34, as shown in FIG. 5, so that the release sheet can be stripped away just prior to securing the composite drainage structure article 120 in place.

The water-impermeable sheet material 38 secured to the drainage mat 126 should, in itself, prevent water from reaching the foundation 134. However, sometimes water-impermeable sheet materials will contain, or develop with age, apertures or cracks. In accordance with an important feature of the present invention, the clay composition layer 22 adjacent the water-impermeable layer 38 will expand upon contact with any water penetrating layer 38 to seal any aperture or crack in layer 38. The clay composition layer 22, therefore, acts as an additional safety layer to make sure that no water will reach the foundation 134, or other structure protected from water damage by the composite article 120, 122 or 124 of the present invention.

FIGS. 8 and 9 show the laminate 40 of the present invention secured to other typical prefabricated drainage structures, generally designated 136 and 138, respectively. FIG. 8 shows the water-impermeable layer side of laminate 40 adhesively secured to drainage structure 136 formed from a plurality of spherical, expanded polystyrene beads 140 adhesively secured together to form water channels between the polystyrene spheres 140. As described with reference to FIGS. 5-7, the drainage structure 138 shown in FIG. 9 is manufactured by the American Enka Company under the trademark ENKADRAIN. Drainage structure 138 is a very curved and twisted, relatively stiff polymeric filament 142 formed into a mat to provide a large void space between the filament forming the mat. As for any other drainage structure, the laminate 40, 40A or 40B of the present invention can be disposed adjacent or secured to one major surface of the drainage structure 138, as shown in FIG. 9. Again, the water-impermeable layer 38, adjacent the drainage structure 136, and the clay composition layer 22, will provide added assurance that water cannot penetrate from the drainage structure through layers 38 and 22 to reach a foundation or other protected areas. Should the layer 38 develop an aperture or crack, the clay composition layer will expand into the aperture or crack to seal against potential water flow while maintaining structural integrity of the sealed area for extended protection.

It should be understood that the present disclosure has been made only by way of preferred embodiment and that numerous changes in details of construction, combination and arrangements of parts may be resorted to without departing from the spirit and scope of the invention as herein claimed.

What is claimed and sought to be secured by Letters Patent of the United States is:

1. A multi-layer article of manufacture comprising a first layer of flexible sheet or web material and a second layer, adhered to said, first layer, including 35-90% by weight water-swellable clay, 1-20% by weight of an elastomer having at least 100% elongation, and 2-50% of a plasticizer compatible with said elastomer.

2. The article of claim 1 wherein said elastomer is partially cross-linked butyl rubber and said plasticizer is included in an amount of 10-30% by weight.

3. The article of claim 1 wherein said plasticizer is selected from the group consisting of epoxidized oils; alkyl monoesters; long chain (8-20 carbon) alkyl diesters; aromatic- napthenic oils; napthenic-aromatic oils; napthenic-paraffinic oils; and paraffinic oils.

4. A multi-layer article of manufacture comprising a first layer of flexible sheet or web material and a second layer, adhered to said first layer, consisting essenially of a water swellable clay in an amount of 35% to 90% by weight, an elastomer in an amount of 1% to 20% by weight, and a plasticizer capable of extending said elastomer in an amount of 2% to 50% by weight of the composition.

* * * * *